US011336412B2

(12) United States Patent
Liu et al.

(10) Patent No.: US 11,336,412 B2
(45) Date of Patent: May 17, 2022

(54) SYNCHRONIZATION SIGNAL CONFIGURATION METHOD AND APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN); Jing Qiu, Chengdu (CN); Xiaoyong Tang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 5 days.

(21) Appl. No.: 16/918,507

(22) Filed: Jul. 1, 2020

(65) Prior Publication Data

US 2020/0336260 A1 Oct. 22, 2020

Related U.S. Application Data

(63) Continuation of application No. PCT/CN2019/072018, filed on Jan. 16, 2019.

(30) Foreign Application Priority Data

Jan. 30, 2018 (CN) .......................... 201810091604.X

(51) Int. Cl.
*H04L 5/00* (2006.01)
*H04W 56/00* (2009.01)
*H04W 88/08* (2009.01)

(52) U.S. Cl.
CPC ............ *H04L 5/005* (2013.01); *H04L 5/0023* (2013.01); *H04W 56/002* (2013.01); *H04W 88/085* (2013.01)

(58) Field of Classification Search
CPC .... H04L 5/005; H04L 5/0023; H04W 56/002; H04W 88/085
See application file for complete search history.

(56) References Cited

U.S. PATENT DOCUMENTS

| 2015/0080040 A1 | 3/2015 | Chang |
| 2017/0251460 A1 | 8/2017 | Agiwal et al. |

(Continued)

FOREIGN PATENT DOCUMENTS

| CN | 105357757 A | 2/2016 |
| CN | 106789800 A | 5/2017 |

(Continued)

OTHER PUBLICATIONS

Extended European Search Report issued in European Application No. 19746654.3 dated Jan. 25, 2021, 9 pages.

(Continued)

*Primary Examiner* — Eric Myers
(74) *Attorney, Agent, or Firm* — Fish & Richardson P.C.

(57) ABSTRACT

Examples synchronization signal configuration methods and apparatus are described. One example method is applied to a relay network including a first node and a second node, and the first node is a parent node of the second node. The example method includes sending synchronization signal configuration information by the first node to the second node, where the synchronization signal configuration information is used to indicate M first synchronization signal time-frequency positions and N second synchronization signal time-frequency positions in a candidate synchronization signal time-frequency position set. The first synchronization signal time-frequency position is used by the second node to send a first synchronization signal, the second synchronization signal time-frequency position is used by the second node to receive or detect a second synchronization signal, the candidate synchronization signal time-fre- (Continued)

quency position set includes W synchronization signal time-frequency positions, and W≥(M+N).

20 Claims, 5 Drawing Sheets

(56) References Cited

U.S. PATENT DOCUMENTS

| | | | |
|---|---|---|---|
| 2017/0311276 A1 | 10/2017 | Tsai et al. | |
| 2020/0084651 A1* | 3/2020 | Li | H04L 5/0053 |
| 2021/0144723 A1* | 5/2021 | Takahashi | H04L 5/0053 |

FOREIGN PATENT DOCUMENTS

| | | |
|---|---|---|
| CN | 106851816 A | 6/2017 |
| CN | 107528682 A | 12/2017 |
| CN | 107548146 A | 1/2018 |
| WO | 2018119558 A1 | 7/2018 |

OTHER PUBLICATIONS

Pozza et al., "Neighbor Discovery for Opportunistic Networking in Internet of things scenarios: A Survey," Special Section on Artificial Intelligence Enabled Networking, vol. 3, May 2015, 31 pages.

AT&T, "NR Initial Access Procedure Design," 3GPP TSG RAN1 Meeting #87, R1-1612361, Reno, USA, Nov. 14-18, 2016, 6 pages.

Office Action issued in Chinese Application No. 201810091604.X dated Dec. 24, 2019, 21 pages (with English translation).

PCT International Search Report and Written Opinion issued in International Application No. PCT/CN2019/072018 dated Apr. 16, 2019, 15 pages (with English translation).

Samsung, "Evaluation assumptions for Integrated Access and Backhaul," 3GPP TSG RAN WG1#90, R1-1714496, Prague, Czech Republic, Aug. 21-25, 2017, 3 pages.

El-Hadidy et al., "A New Algorithm to Improve the Operation of Distance Relays Zone 3 by Using Synchronized Phasor Measurements," 2010 Modern Electric Power Systems, Dec. 2010, 6 pages.

Office Action issued in Chinese Application No. 201810091604.X dated Aug. 23, 2021, 4 pages.

* cited by examiner

SYNCHRONIZATION SIGNAL CONFIGURATION METHOD AND APPARATUS

CROSS-REFERENCE TO RELATED APPLICATIONS

This application is a continuation of International Application No. PCT/CN2019/072018, filed on Jan. 16, 2019, which claims priority to Chinese Patent Application No. 201810091604.X, filed on Jan. 30, 2018. The disclosures of the aforementioned applications are hereby incorporated by reference in their entireties.

TECHNICAL FIELD

Embodiments of this application relate to the field of communications technologies, and in particular, to a synchronization signal configuration method and apparatus.

BACKGROUND

In a new radio (NR) communications system, a high frequency electromagnetic wave is mainly used for communication. The high frequency electromagnetic wave has disadvantages such as a poor diffraction capability and severe propagation attenuation. Consequently, there is a coverage hole in a communications network. The coverage hole in the communications network can be avoided by introducing a relaying transmission and reception point (rTRP) that has a wireless backhaul link. The relaying transmission and reception point may be referred to as a relay node.

In a multi-hop multi-connection relay network of an integrated access and backhaul (IAB) link in the NR communications system, one relay node may provide a service for another relay node, that is, one relay node may have a parent node and a child node. For example, in a relay network shown in FIG. 1, an rTRP 1 may provide a service for an rTRP 2. A base station is a parent node of the rTRP 1, and the rTRP 2 is a child node of the rTRP 1. When there are a plurality of relay nodes in an area, to facilitate route switching and multi-connection establishment of the relay nodes, the plurality of relay nodes should have a capability of mutual discovery.

In the prior art, user equipment (UE) may discover one or more network devices by detecting a synchronization signal. For example, a network device in the NR system sends a maximum of L synchronization signal/physical broadcast channel blocks (SS/PBCH block, SSB) within 5 ms. The L SSBs may be referred to as a synchronization signal block burst set (SSB burst set). The UE may detect the L SSBs, to perform synchronization and network device discovery. The SSB burst set is periodically repeated, and a period is configurable. When a high frequency carrier (for example, a carrier having a frequency higher than 6 GHz) is used. L=64, that is, the UE needs to detect all possible positions of 64 SSBs to discover the network device.

In the foregoing method, relatively high resource and time overheads are required. However, in the multi-hop multi-connection relay network, during normal working, the relay node needs to continuously send signals to the child node and receive signals from the parent node. Consequently, it is difficult to coordinate plenty of resources to perform SSB detection by using the foregoing method, to implement mutual discovery between relay nodes.

SUMMARY

Embodiments of this application provide a synchronization signal configuration method and apparatus, to reduce resource and time overheads for mutual discovery between relay nodes.

To achieve the foregoing objectives, the following technical solutions are used in the embodiments of this application:

According to a first aspect, a synchronization signal configuration method is provided. The method is applied to a relay network including a first node and a second node, and the first node is a parent node of the second node. The method includes: sending, by the first node, synchronization signal configuration information to the second node, where the synchronization signal configuration information is used to indicate M first synchronization signal time-frequency positions and N second synchronization signal time-frequency positions in a candidate synchronization signal time-frequency position set. The first synchronization signal time-frequency position is used by the second node to send a first synchronization signal, the second synchronization signal time-frequency position is used by the second node to receive or detect a second synchronization signal, a candidate synchronization signal position set includes W synchronization signal time-frequency positions, and W≥(M+N).

For example, in a new radio (NR) communications system, a primary synchronization signal (PSS), a secondary synchronization signal (SSS), and a broadcast channel are sent on four consecutive OFDM symbols, and are referred to as a synchronization signal/physical broadcast channel block (SS/PBCH block). When the configuration method provided in the first aspect is applied to the NR system, the configuration method includes configuration of sending and receiving an entire SS/PBCH block.

According to a second aspect, a synchronization signal configuration method is provided. The method is applied to a relay network including a first node and a second node, and the first node is a parent node of the second node. The method includes: receiving, by the second node, synchronization signal configuration information from the first node, where the synchronization signal configuration information is used to indicate M first synchronization signal time-frequency positions and N second synchronization signal time-frequency positions in a candidate synchronization signal set, the candidate synchronization signal set includes W synchronization signals, and W≥(M+N); and sending, by the second node, first synchronization signals at the M first synchronization signal time-frequency positions based on the synchronization signal configuration information, and receiving or detecting second synchronization signals at the second synchronization signal time-frequency positions based on the synchronization signal configuration information.

In the foregoing technical solution, the first node sends the synchronization signal configuration information to the second node, where the synchronization signal configuration information is used to indicate time-frequency positions at which the second node sends M first synchronization signals and time-frequency positions at which the second node detects N second synchronization signals, so that after receiving the synchronization signal configuration information, the second node can send the first synchronization signals based on the synchronization signal configuration information and detect second synchronization signals of other nodes based on the synchronization signal configuration information. In this way, the other nodes may detect the first synchronization signals of the second node at the M first synchronization signal time-frequency positions, and the second node may detect the second synchronization signals of the other nodes at the N second synchronization signal time-frequency positions, thereby implementing mutual discovery between relay nodes and preventing the relay node from detecting each synchronization signal time-frequency position in the candidate synchronization signal time-frequency position set. This reduces resource and time overheads for the mutual discovery between the relay nodes.

In a possible implementation of the first aspect or the second aspect, the synchronization signal configuration information is further used to indicate transmit beam information of H of the M first synchronization signals, and M≥H. Optionally, the first node sends, to the second node, indication information used to indicate the transmit beam information of the H of the M first synchronization signals. In the foregoing possible implementation, the transmit beam information of the first synchronization signals is indicated, so that time overheads for performing beam scanning by the relay node can be further reduced.

In a possible implementation of the first aspect or the second aspect, transmit beam information of at least one of the H first synchronization signals is associated with a piece of specified transmit beam information of the second node. For example, the specified transmit beam information may be transmit beam information of a synchronization signal or a reference signal that is configured by the second node.

In a possible implementation of the first aspect or the second aspect, at least one of the H first synchronization signals is associated with a specified transmit signal of the second node. For example, the at least one first synchronization signal is associated with a synchronization signal or a reference signal that is configured by the second node, that is, the configured synchronization signal or the configured reference signal is replicated to a time-frequency position of the at least one first synchronization signal.

In a possible implementation of the first aspect or the second aspect, the relay network further includes a third node, and transmit beam information of at least one of the H first synchronization signals is associated with specified transmit beam information of the third node.

In a possible implementation of the first aspect or the second aspect, the transmit beam information of the at least one first synchronization signal is associated with receive beam information of a specified transmit signal of the third node received by the second node. The at least one first synchronization signal may include one or more first synchronization signals. When the at least one first synchronization signal includes a plurality of first synchronization signals, the plurality of first synchronization signals may correspond to one beam, or may correspond to a plurality of beams. In other words, the receive beam information may include one or more beams.

In a possible implementation of the first aspect or the second aspect, the relay network further includes a third node, and at least one of the H first synchronization signals is associated with a specified transmit signal of the third node. The specified transmit signal of the third node may be reported by the second node to the first node.

In a possible implementation of the first aspect or the second aspect, transmit beam information of at least one of (M-H) first synchronization signals may be customized by the second node.

In a possible implementation of the first aspect or the second aspect, transmit beam information of at least one of the H first synchronization signals is associated with a piece of specified transmit beam information of the first node.

In a possible implementation of the first aspect or the second aspect, at least one of the H first synchronization signals is associated with a specified transmit signal of the first node.

In a possible implementation of the first aspect or the second aspect, the synchronization signal configuration information is further used to indicate receive beam information of K of the N second synchronization signals received by the second node. In the foregoing possible implementation, the transmit beam information of the second synchronization signals is indicated, so that time overheads for performing beam scanning by the relay node can be further reduced.

In a possible implementation of the first aspect or the second aspect, receive beam information of at least one of the K second synchronization signals is associated with a piece of specified transmit beam information of the second node. For example, the specified transmit beam information may be transmit beam information that is configured by the second node and that is used when the second node sends a synchronization signal or a reference signal to another node.

In a possible implementation of the first aspect or the second aspect, at least one of the K second synchronization signals is associated with a specified transmit signal of the second node. The specified transmit signal may be a synchronization signal or a reference signal that is configured by the second node.

In a possible implementation of the first aspect or the second aspect, the relay network further includes a third node, and receive beam information of at least one of the K second synchronization signals is associated with receive beam information of a specified transmit signal of the third node received by the second node. The first node may instruct the second node to detect a synchronization signal or a reference signal of the third node on the at least one second synchronization signal, and the used receive beam information may be configured receive beam information that is used when the second node communicates with the third node. In addition, the at least one second synchronization signal may include one or more second synchronization signals. When the at least one second synchronization signal includes a plurality of second synchronization signals, the plurality of second synchronization signals may correspond to one beam, or may correspond to a plurality of beams. In other words, the receive beam information may include one or more beams.

In a possible implementation of the first aspect or the second aspect, receive beam information of at least one of the K second synchronization signals is associated with a piece of specified transmit beam information of the first node.

In a possible implementation of the first aspect or the second aspect, at least one of the K second synchronization signals is associated with a specified transmit signal of the first node.

In a possible implementation of the first aspect or the second aspect, the relay network further includes a fourth node. The first node may instruct the second node to detect a synchronization signal of a fourth signal on the at least one second synchronization signal, and the first node may not indicate the receive beam information of the at least one second synchronization signal.

In a possible implementation of the first aspect or the second aspect, when the second node is in a mobile state, the second node needs to continuously perform scanning for radio resource management and switching. The first node may configure that a beam scanned by the second node does not conflict with a beam sent by the second node. For example, scanning performed by the mobile second node on a synchronization signal time-frequency position set is restricted, that is, the second node is configured not to scan a time-frequency position at which the second node sends a synchronization signal, so that synchronization signal configuration of the mobile second node is implemented, and the second node and other relay nodes in a network can discover each other.

In a possible implementation of the first aspect or the second aspect, the mutual discovery between the relay nodes may alternatively be implemented by configuring a reference signal of the relay node included in the relay network. For example, the first node may configure a position at which the second node sends a first reference signal and a position at which the second node detects a second reference signal of another relay node, so that the second node can send the first reference signal at the corresponding position and detect the second reference signal of the another relay node at the corresponding position, to implement the mutual discovery between the relay nodes. Specifically, a process in which the mutual discovery between the relay nodes is implemented by configuring the reference signal of the relay node included in the relay network is similar to the foregoing process of configuring the synchronization signal of the relay node. For details, refer to the foregoing descriptions. Details are not described again in this embodiment of this application.

According to another aspect of this application, a first node is provided. The first node is configured to implement a function in the synchronization signal configuration method according to any one of the first aspect or the possible implementations of the first aspect. The function may be implemented by hardware, or may be implemented by hardware executing corresponding software. The hardware or software includes one or more units corresponding to the foregoing function.

In a possible implementation, a structure of the first node includes a processor and a memory. The memory stores code and data, and is coupled to the processor. The processor is configured to support the first node in performing the synchronization signal configuration method according to any one of the first aspect or the possible implementations of the first aspect. Optionally, the first node may further include a communications interface and a bus. The communications interface is connected to the memory and the processor by using the bus.

According to another aspect of this application, a second node is provided. The second node is configured to implement a function in the synchronization signal configuration method according to any one of the second aspect or the possible implementations of the second aspect. The function may be implemented by hardware, or may be implemented by hardware executing corresponding software. The hardware or software includes one or more units corresponding to the foregoing function.

In a possible implementation, a structure of the second node includes a processor and a memory. The memory stores code and data, and is coupled to the processor. The processor is configured to support the second node in performing the synchronization signal configuration method according to any one of the second aspect or the possible implementations of the second aspect. Optionally, the second node may further include a communications interface and a bus. The communications interface is connected to the memory and the processor by using the bus.

According to another aspect of this application, a computer-readable storage medium is provided. The computer-readable storage medium stores an instruction, and when the instruction is run on a computer, the computer is enabled to perform the synchronization signal configuration method according to any one of the first aspect or the possible implementations of the first aspect.

According to another aspect of this application, a computer-readable storage medium is provided. The computer-readable storage medium stores an instruction, and when the instruction is run on a computer, the computer is enabled to perform the synchronization signal configuration method according to any one of the second aspect or the possible implementations of the second aspect.

According to another aspect of this application, a computer program product including an instruction is provided. When the computer program product is run on a computer, the computer is enabled to perform the synchronization signal configuration method according to any one of the first aspect or the possible implementations of the first aspect.

According to another aspect of this application, a computer program product including an instruction is provided. When the computer program product is run on a computer, the computer is enabled to perform the synchronization signal configuration method according to any one of the second aspect or the possible implementations of the second aspect.

According to another aspect of this application, a communications system is provided. The communications system includes a first node and a second node. The first node is a parent node of the second node. The first node is configured to perform the synchronization signal configuration method according to any one of the first aspect or the possible implementations of the first aspect; and/or the second node is configured to perform the synchronization signal configuration method according to any one of the second aspect or the possible implementations of the second aspect.

It may be understood that any one of the apparatus, the computer storage medium, or the computer program product for the synchronization signal configuration method provided above is configured to perform the corresponding method provided above. Therefore, for beneficial effects that can be achieved by the apparatus, the computer storage medium, or the computer program product, refer to beneficial effects of the corresponding method provided above. Details are not described herein again.

DESCRIPTION OF EMBODIMENTS

Figure 1:
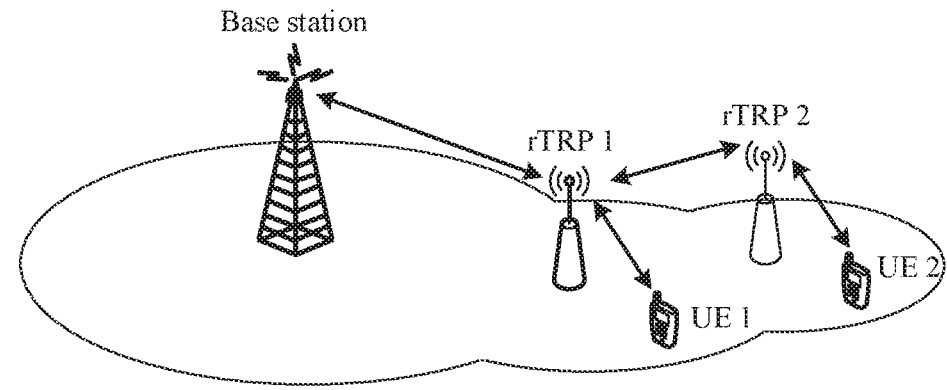
FIG. 1 is a schematic structural diagram of a relay network.

Before embodiments of this application are described, technical terms in the embodiments of this application are first described.

High frequency carrier and low frequency carrier: An available frequency band in a communications system may be classified into two frequency bands, for example, may be classified into a frequency band lower than 6 GHz and a frequency band higher than 6 GHz by using 6 GHz as a classification standard. A carrier in the frequency band lower than 6 GHz may be referred to as a low frequency carrier, and a carrier in the frequency band higher than 6 GHz may be referred to as a high frequency carrier. A carrier in a frequency band of 6 GHz may be classified into the high frequency carrier, or may be classified into the low frequency carrier. It should be understood that, in the embodiments of this application, the frequency bands of the low frequency carrier and the high frequency carrier are relative concepts, and another standard may alternatively be used for classification of the low frequency carrier and the high frequency carrier. One carrier may include a plurality of beams. A coverage area of the plurality of beams falls within a coverage area of the carrier, that is, the coverage area of the plurality of beams is a subset of the coverage area of the carrier. The carrier may be the high frequency carrier, or may be the low frequency carrier.

Beam: The beam is a communication resource. The beam may be a wide beam, a narrow beam, or another type of beam. A technology for forming the beam may be a beamforming technology or another technical means. The beamforming technology may specifically be a digital beamforming technology, an analog beamforming technology, or a mixed digital/analog beamforming technology. Different beams may be considered as different resources. The same information or different information may be sent by using different beams. Optionally, a plurality of beams having a same or similar communication feature may be considered as one beam. One beam may include one or more antenna ports configured to transmit a data channel, a control channel, a sounding signal, and the like. For example, a transmit beam may refer to signal strength distribution formed by a signal in different directions of space after the signal is transmitted out by using an antenna, and a receive beam may refer to signal strength distribution of a radio signal received from an antenna in different directions of space. It may be understood that the one or more antenna ports forming the beam may alternatively be considered as an antenna port set. The beam may alternatively be represented in a protocol by using a spatial filter, an antenna port quasi co-location (antenna port QCL) relationship, or a spatial receive parameter (spatial Rx parameter). The beam may be represented in a protocol by using numbers of various signals, for example, a number of a channel state information-reference signal (CSI-RS), a number of a synchronization signal/physical broadcast channel (SS/PBCH), a number of a sounding reference signal (SRS), a number of a tracking reference signal (TRS), or the like.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

An SS/PBCH block may also be written as an SS block/a PBCH block, and may be translated into a "synchronization signal/physical broadcast channel block". A signal used for cell search sent by a network side may include a primary synchronization signal, a secondary synchronization signal, and a physical broadcast channel.

Currently, the high frequency carrier may be applied to a plurality of communications systems, for example, a long term evolution (LTE) communications system, a new radio (NR) communications system, or a communications system that may appear in the future. The high frequency carrier has disadvantages such as a poor diffraction capability and severe propagation attenuation. Consequently, there is a coverage hole in a communications network. Due to factors such as deployment costs, it is difficult for an operator to avoid the coverage hole by depending only on a wired transmission and reception point (TRP). Therefore, it is necessary to introduce a relaying TRP (rTRP) that has a wireless backhaul link. It should be noted that there is no formal name of an NR relay node. The name used in this application is merely an example.

Figure 2:
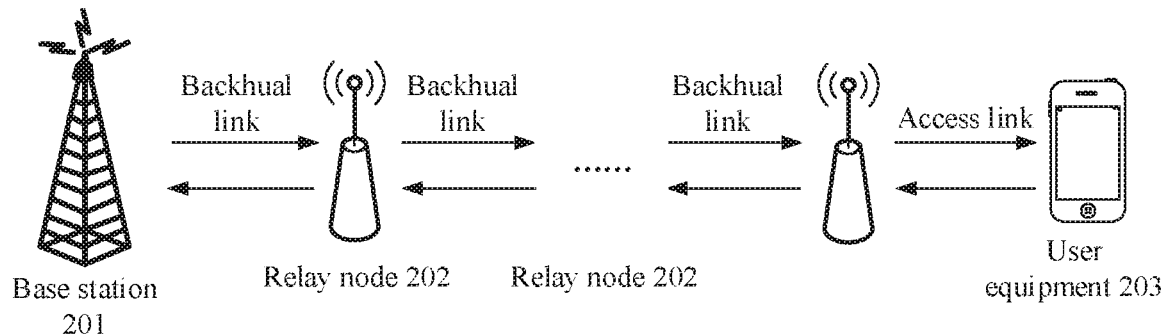
FIG. 2 is a schematic structural diagram of a communications system according to an embodiment of this application.

FIG. 2 is a schematic structural diagram of a communications system according to an embodiment of this application. The communications system may also be referred to as a relay network. Referring to FIG. 2, the communications system includes a base station 201, a relay node 202, and user equipment 203. The base station 201 may be an evolved NodeB (eNodeB), a NodeB, a macro base station, an access point device, a transmission and reception point (TRP), or the like. For ease of description, the foregoing base stations are collectively referred to as base stations in the embodiments of this application. The relay node 202 may be a relay device, a relay device station, an access point device, a micro base station, a TRP, an rTRP, or the like. For ease of description, the foregoing relay nodes are collectively referred to as relay nodes in the embodiments of this application. The user equipment 203 may be a handheld device, a vehicle-mounted device, a wearable device, a computing device, a mobile station, a mobile console, a wireless communications device, a terminal, or the like. For ease of description, the foregoing user equipment is collectively referred to as user equipment in the embodiments of this application.

A link between the base station 201 and the relay node 202 and a link between the relay nodes 202 may be referred to as a backhaul link (BL), and a link between the relay node 202 and the user equipment 203 may be referred to as an access link (AL).

Figure 3:
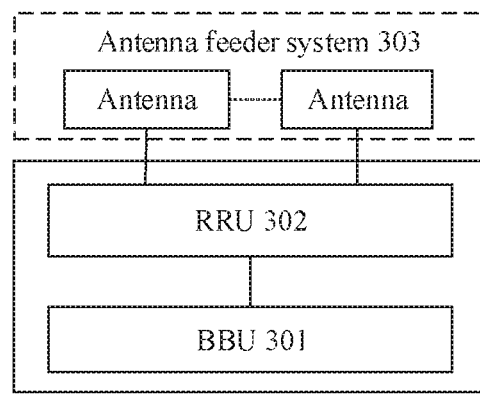
FIG. 3 is a schematic structural diagram of a base station/relay node according to an embodiment of this application.

FIG. 3 is a schematic structural diagram of a base station/relay node according to an embodiment of this application. The base station/relay node may include a building baseband unit (BBU) 301 and a remote radio unit (RRU) 302. The RRU 302 is connected to an antenna feeder system 303. The BBU 301 and the RRU 302 may be disassembled for use as required. The structure shown in FIG. 3 may be a structure of the base station, or may be a structure of the relay node. The BBU 301 is configured to: implement operation and maintenance of the entire base station or relay node, implement signaling processing, radio resource management, and a transmission interface to a packet core network, and implement main control functions of a physical layer, a medium access control layer. L3 signaling, and operation and maintenance. The RRU 302 is configured to implement conversion between a baseband signal and a radio frequency signal, demodulation of a radio receive signal, modulation and power amplification of a radio transmit signal, and the like. The antenna feeder system 303 may include a plurality of antennas, and is configured to receive and send a wireless air interface signal. A person skilled in the art may understand that, in a specific implementation process, the base station/relay node may alternatively use another general-purpose hardware structure, but is not limited to the hardware structure shown in FIG. 3.

In a communications system, a node may discover another node by scanning a synchronization signal. In a low frequency carrier, time-frequency synchronization needs to be implemented during node discovery. In a high frequency carrier, in addition to the time-frequency synchronization, beam alignment further needs to be implemented during the node discovery. To implement the beam alignment, both a node at a transmit end and a node at a receive end need to perform beam scanning. For example, a maximum of 64 SSBs are usually used for beam scanning at the transmit end. It is assumed that 32 beams are used for scanning at the transmit end, and eight beams are used for beam scanning at the receive end. In this case, a total of 256 times of detection are required to complete the beam scanning, resulting in relatively high resource and time overheads. Such overheads may be unacceptable for a relay node that needs to serve UE.

In addition, the relay node usually performs half-duplex transmission. When detecting a signal (including a synchronization signal, a reference signal, and the like) of another node, the relay node cannot send a signal to a child node. However, the relay node needs to continuously send various signals to the child node during working. Therefore, it is difficult for the relay node during normal working to perform node discovery and detection that requires high overheads. Further, to simplify UE detection, each relay node may synchronously send an SSB. Consequently, a capability of detecting another node by the relay node is further limited.

Therefore, it is difficult for the relay node during normal working to coordinate plenty of resources and time to discover and scan another node due to a feature of the relay node such as half-duplex constraint. However, when the relay node is a new network access node or an idle node (the new network access node or the idle node is used as an example, but the relay node is not limited to a new node or the idle node), plenty of resources and time can be provided for neighboring node scanning.

Figure 4:
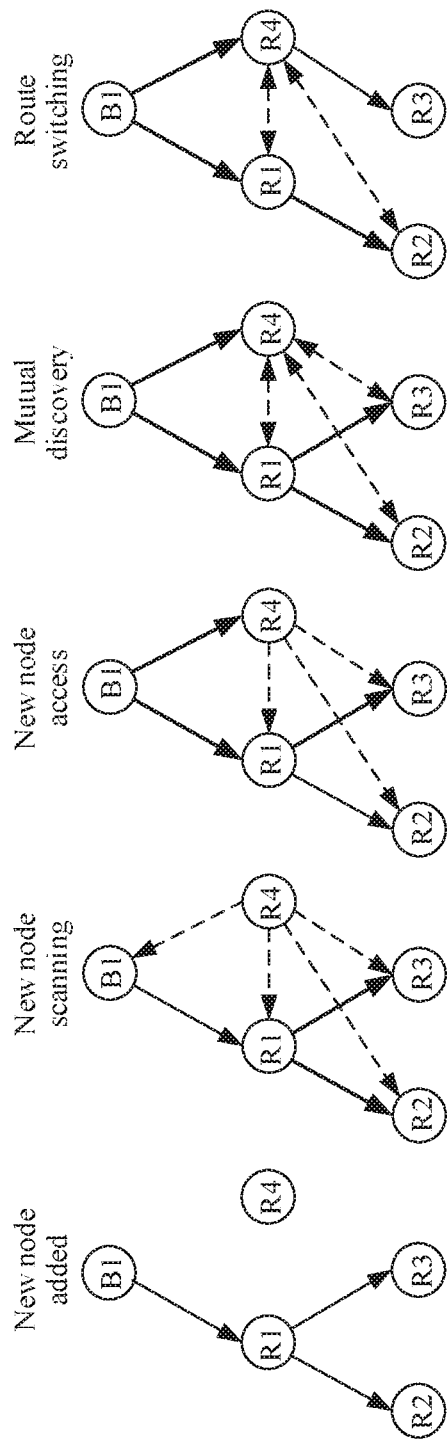
FIG. 4 is a schematic diagram of adding a node to a relay network according to an embodiment of this application.

As shown in FIG. 4, a new node access process and a subsequent process are used herein as an example to describe mutual discovery and application between nodes. In FIG. 4, B1 has a plurality of child nodes (for example, R1, R2, R3, and R4). Herein, a perspective of R4 is used as an example for description. R4 accesses B1, and is visible to other relay nodes. Herein, that the nodes are visible to each other may mean that a node may measure a reference signal or a synchronization signal of another node.

In FIG. 4, R1 to R4 are all child relay nodes of B1. However, it is not limited in this application that the relay nodes that perform the mutual discovery belong to a same donor node. The donor node in a relay network may be understood as a node that provides a service for the child node.

As shown in FIG. 4, a new node (R4) is added to an area and switched on. After being switched on, R4 performs scanning and discovers other nodes (for example, B1 and R1 to R3). R4 then accesses the node B1. After access, R4 reports a scanning result of R4 to B1, or R4 is configured by B1 to perform further scanning. For example, B1 specifies several target node IDs and SSB indexes or other reference resources for R4, so that R4 performs scanning, and then B1 configures R4 to re-report a scanning result. It should be noted that, in this scanning process, an existing RRM (radio resource management) process may be reused. B1 then configures a synchronization signal or a reference signal of R4, and configures measurement windows of the other nodes, to implement the mutual discovery between the nodes. After the mutual discovery, the relay node may perform route switching based on a factor such as a measurement result. For example, in FIG. 4, R3 is switched from R2 to R4.

Figure 5:
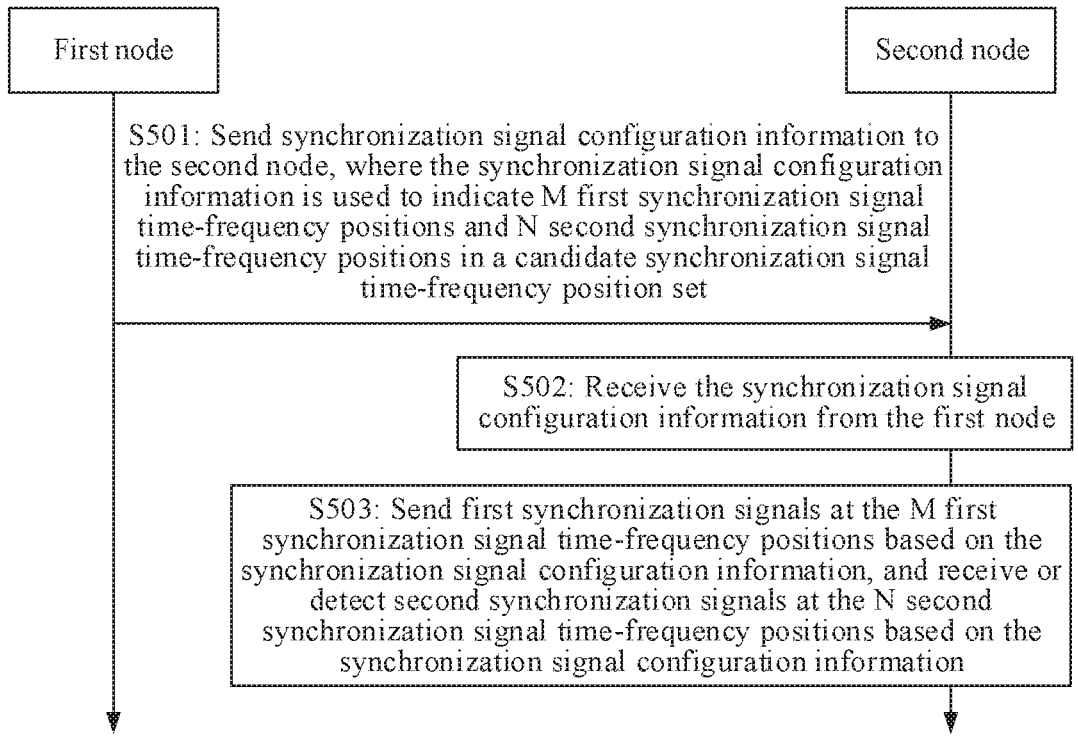
FIG. 5 is a schematic flowchart of a synchronization signal configuration method according to an embodiment of this application.

FIG. 5 is a schematic flowchart of a synchronization signal configuration method according to an embodiment of this application. The method is applied to a relay network including a first node and a second node. Referring to FIG. 5, the method includes the following several steps.

S501: The first node sends synchronization signal configuration information to the second node, where the synchronization signal configuration information is used to indicate M first synchronization signal time-frequency positions and N second synchronization signal time-frequency positions in a candidate synchronization signal time-frequency position set, the first synchronization signal time-frequency position is used by the second node to send a synchronization signal, and the second synchronization signal time-frequency position is used by the second node to receive or detect a synchronization signal.

The configuration information may be carried by using RRC (radio resource control) layer signaling, MAC (medium access control) layer signaling, or a MAC CE (MAC control element), or may be sent by using higher layer signaling (for example, X2 interface signaling in LTE or Xn interface signaling in NR) or the like. Signaling used to send information is not limited in this application.

The first node may be a base station in the relay network, or may be a relay node in the relay network. For example, the first node may be the base station 201 in FIG. 2, or may be the relay node 202 in FIG. 2. The second node may be a relay node in the relay network, and the first node is a parent node of the second node. For example, when the first node is the base station 201 in FIG. 2, the second node may be any relay node 202 in FIG. 2; or when the first node is a particular relay node 202 in FIG. 2, the second node may be another relay node 202 between the particular relay node 202 and the user equipment 203.

A candidate synchronization signal position set includes W synchronization signal time-frequency positions, and W is a positive integer. In an NR system, a primary synchronization signal (PSS), a secondary synchronization signal (SSS), and a broadcast channel are sent on four consecutive OFDM symbols, and are referred to as an SS/PBCH block. When the configuration method can be applied to the NR system, the configuration method includes configuration of sending or receiving an entire SS/PBCH block. Correspondingly, in the NR system, S501 may be: The first node sends synchronization signal configuration information to the second node, where the synchronization signal configuration information is used to indicate M first SS/PBCH block time-frequency positions and N second SS/PBCH block time-frequency positions in a candidate synchronization signal/physical broadcast channel block (SS/PBCH block) set.

In the NR, a plurality of synchronization signals are sent within 5 ms (a half-frame). For example, in a low frequency, four or eight synchronization signals are sent within 5 ms, and in a high frequency, 64 synchronization signals are sent within 5 ms. A plurality of synchronization signals that are simultaneously sent are referred to as an SSB burst set. The SSB burst set is repeatedly sent in a periodic manner. An optional period may be 5 ms, 20 ms, or the like. Apparently, both a start position (a frame number and a half-frame position) of 5 ms within which the second node sends the SSB burst set and a sending period may be configured by the first node, or may be configured by the second node and then reported to the first node, or may be configured in a combination of the two manners. For example, a start position of SSB transmission is configured by the first node, and a period of the SSB transmission is determined by the second node and reported to the first node.

In this application, W may represent a quantity of SSB candidate positions within 5 ms (for example, in the high frequency, W=64). It should be noted that the base station or the relay node does not need to send the synchronization signals at all 64 SSB candidate positions, but may choose to send the synchronization signals at some synchronization signal positions, to reserve other synchronization signal positions for data transmission or receiving synchronization signals of other nodes.

When this application is applied to a reference signal such as a CSI-RS or an SRS or a newly defined reference signal such as a discovery signal, a time-frequency position at which the reference signal is sent and received is not necessarily selected from W predefined positions, but is determined in another manner. For example, the first node directly configures a time-frequency position, a period, and the like for a resource used to send or receive the reference signal.

In another possible implementation, when this application is applied to a synchronization signal, SSB reception and SSB transmission may not be performed in a same SSB burst set. For example, the second node performs transmission in an SSB set (64 positions), and performs reception in another SSB set (64 positions). In addition, the two SSB sets may have different periods. The solutions of the present invention may alternatively be applied only to some SSB sets. For example, the SSB transmission and the SSB reception described in the present invention are performed in some SSB sets, only the SSB transmission is performed in other SSB sets, and only SSB reception or detection is performed in some other SSB sets.

Based on the above, in addition to the time-frequency resource selection method described in this application, a time-frequency resource configuration for receiving and sending the reference signal may be resolved by using an existing technology. This is not limited in this application. In this application, a method for indicating a beam or a QCL after reception and transmission of the synchronization signal or the reference signal are configured is mainly considered.

If this application is applied to the high frequency, the QCL is mainly a spatial QCL, that is, a type D QCL in the NR.

It should be noted that the method provided in this embodiment of this application may further be applied to another communications system or another discovery signal. The following is described by using the synchronization signal in the NR system as an example, but this does not constitute a limitation on the embodiments of this application.

In the NR system, when a low frequency carrier is used in the system, a maximum quantity of W SS/PBCH blocks included in a candidate SS/PBCH block set may be four or eight (that is, W=4 or W=8). When a high frequency carrier is used in the system, a maximum quantity of W SS/PBCH blocks may be 64 (that is, W=64). The candidate SS/PBCH block set may also be referred to as an SS/PBCH block burst set. The SS/PBCH block burst set may be periodically repeated, and a period of the SS/PBCH block burst set is configurable.

W≥(M+N), that is, W may be greater than a sum of M and N, or W may be equal to a sum of M and N. Both M and N may be integers. When W is greater than the sum of M and N, there are (W−M−N) SS/PBCH blocks that are not configured in the W SS/PBCH blocks, and the (W-M-N) SS/PBCH blocks that are not configured may be referred to as blank SS/PBCH blocks (or reserved SS/PBCH blocks). When W is equal to the sum of M and N, all the W SS/PBCH blocks are configured.

In addition, the time-frequency position may include a time domain position and a frequency domain position. For example, the time domain position may be a position of a symbol on a time axis, and the symbol may be an OFDM symbol. The frequency domain position may be a position of a subcarrier on a frequency axis, and the subcarrier may be represented by using a subcarrier spacing and a center frequency, or may be represented by using a subcarrier identifier or the like. In the NR, a synchronization signal time-frequency position may be determined based on an index of the SS/PBCH block.

Specifically, the first node may be an parent node of a plurality of relay nodes (or a plurality of relay nodes may be child nodes of the first node). The first node may send the synchronization signal configuration information to each of the plurality of relay nodes. The second node is any one of the plurality of relay nodes. The first node may send the synchronization signal configuration information to the second node. The synchronization signal configuration information is used to configure a time-frequency position at which the second node sends the synchronization signal, and configure a time-frequency position at which the second node detects a synchronization signal of another node. If the first node is also a relay node, the configuration information sent by the first node to the second node may be provided by a parent node or a donor node of the first node. Herein, the donor node may be a base station having a wired connection.

Figure 6:
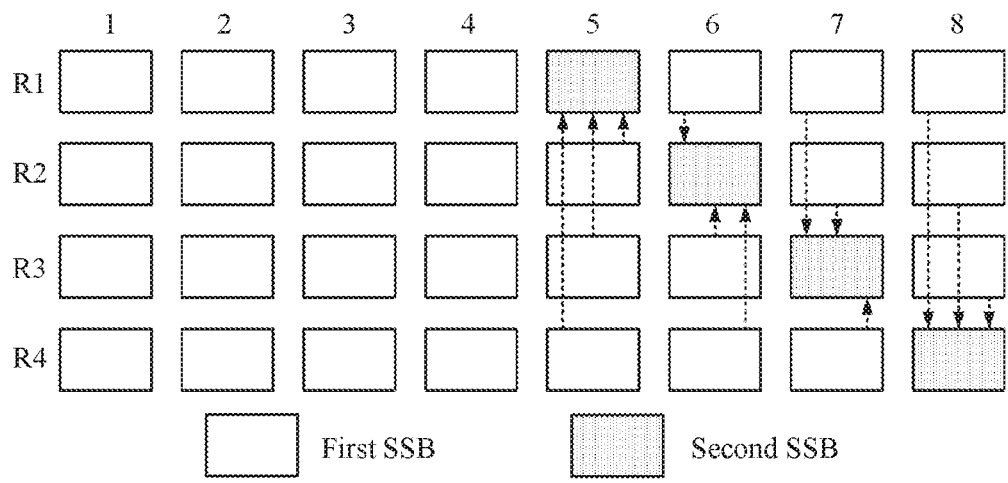
FIG. 6 is a schematic diagram of detecting a synchronization signal according to an embodiment of this application.

For example, it is assumed that the plurality of relay nodes may include R1 to R4, the candidate SS/PBCH block set includes eight SS/PBCH blocks (W=8), and the synchronization signal configuration information sent to the relay nodes indicates seven first SS/PBCH block time-frequency positions (M=7) and one second SS/PBCH block time-frequency position (N=1). FIG. 6 shows a time-frequency position at which each of the plurality of relay nodes sends the synchronization signal and a time-frequency position at which each of the plurality of relay nodes detects the synchronization signal.

In FIG. 6, description is made by using an example in which each relay node detects synchronization signals of a plurality of other relay nodes at a second SS/PBCH block position. For example, a second SS/PBCH block position used by R1 to detect synchronization signals is a fifth SS/PBCH block, and R1 detects synchronization signals of R2 to R4 at a fifth SS/PBCH block position; a second SS/PBCH block position used by R2 to detect synchronization signals is a sixth SS/PBCH block, and R2 detects synchronization signals of R1, R3, and R4 on the sixth SS/PBCH block; a second SS/PBCH block position used by R3 to detect synchronization signals is a seventh SS/PBCH block, and R3 detects synchronization signals of R1, R2, and R4 on the seventh SS/PBCH block: and a second SS/PBCH block used by R4 to detect synchronization signals is an eighth SS/PBCH block position, and R4 detects synchronization signals of R1 to R3 on an eighth SS/PBCH block.

It may be learned from the foregoing content that, when sending the synchronization signal configuration information to the plurality of child relay nodes, the first node may instruct one relay node to detect synchronization signals of other relay nodes at one or more SS/PBCH block positions, and instruct the other relay nodes to send the synchronization signals at corresponding SS/PBCH block positions, so that one relay node can simultaneously detect the synchronization signals of the plurality of other relay nodes, thereby reducing, as much as possible, resource and time overheads for detecting the SS/PBCH block by the relay node, and implementing mutual discovery between the relay nodes that requires low overheads.

Certainly, the first node may alternatively instruct one relay node to detect synchronization signals of different relay nodes at one or more different SS/PBCH block positions, and instruct the different relay nodes to send the synchronization signals at corresponding SS/PBCH block positions, so that one relay node detects different SS/PBCH blocks for a plurality of times, to obtain the synchronization signals of the plurality of other relay nodes. In this way, compared with the prior art, resource and time overheads for mutual discovery between the relay nodes can also be reduced. A specific relationship between the SS/PBCH blocks detected by the plurality of different relay nodes and the SS/PBCH blocks sent by the plurality of different relay nodes may be any relationship described above, or may be a relationship described in another possible implementation. This is not limited in this embodiment of this application.

During actual application, the synchronization signal configuration information may be used to configure only a time-frequency position at which the second node sends the synchronization signal (that is, a first SS/PBCH block time-frequency position), or may be used to configure only a time-frequency position at which the second node detects the synchronization signal of the another node (that is, a second SS/PBCH block time-frequency position), or may be used to configure both the first SS/PBCH block time-frequency position and the second SS/PBCH block time-frequency position. In other words, a value of the quantity M of the first SS/PBCH blocks may be an integer greater than or equal to 0, and a value of the quantity N of the second SS/PBCH blocks may also be an integer greater than or equal to 0. This is not specifically limited in this embodiment of this application. In addition, the synchronization signal configuration information may further include information such as a start position (for example, a frame number and a half-frame number), a period, and the like of the candidate SS/PBCH block set.

Further, when the first node is the base station, the synchronization signal configuration information may be generated by the first node; or when the first node is the relay node, the synchronization signal configuration information may be generated by the first node, or may be generated by the parent node of the first node and sent to the first node. This is not specifically limited in this embodiment of this application.

S502: The second node receives the synchronization signal configuration information from the first node.

The synchronization signal configuration information in S502 is consistent with the synchronization signal configuration information in S501. For details, refer to the description in S501. Details are not described in this embodiment of this application again.

S503: The second node sends synchronization signals at the M first synchronization signal time-frequency positions based on the synchronization signal configuration information, and receives or detects synchronization signals at the N second synchronization signal time-frequency positions based on the synchronization signal configuration information.

In the NR system, the M first synchronization signal time-frequency positions may be M first SS/PBCH block positions, and the N second synchronization signal time-frequency positions may be N second SS/PBCH block positions.

After the second node receives the synchronization signal configuration information, the second node may determine the M first SS/PBCH block time-frequency positions and the N second SS/PBCH block time-frequency positions based on the synchronization signal configuration information, send the synchronization signals at the M first SS/PBCH block time-frequency positions, and detect the synchronization signals of the other nodes at the N second SS/PBCH block time-frequency positions.

Optionally, when N=0, that is, when the synchronization signal configuration information is used to configure the M first SS/PBCH block time-frequency positions, the second node may determine the M first SS/PBCH block time-frequency positions based on the synchronization signal configuration information, and send the synchronization signals at the M first SS/PBCH block time-frequency positions. When M=0, that is, when the synchronization signal configuration information is used to configure the N second SS/PBCH block time-frequency positions, the second node may determine the N second SS/PBCH block time-frequency positions based on the synchronization signal configuration information, and detect the synchronization signals of the other nodes at the N second SS/PBCH block time-frequency positions.

Further, before S501, the method may further include: sending, by the second node, reporting information to the first node, where the reporting signal is used to indicate a transmission capability of the second node. For example, the second node reports, to the first node, a quantity of first SS/PBCH blocks required by the second node, so that the first node can determine, based on the quantity of first SS/PBCH blocks reported by the second node, M first SS/PBCH blocks in the synchronization signal configuration information. The quantity of first SS/PBCH blocks reported by the second node may be equal to M, or may not be equal to M. This is not specifically limited in this embodiment of this application.

In this embodiment of this application, the first node is the parent node of the second node, and the first node sends the synchronization signal configuration information to the second node, where the synchronization signal configuration information is used to indicate the M first SS/PBCH block time-frequency positions at which the synchronization signals are sent and the N second SS/PBCH block time-frequency positions at which the synchronization signals are detected, so that when receiving the synchronization signal configuration information, the second node can send the synchronization signals based on the synchronization signal configuration information and detect the synchronization signals of the other nodes based on the synchronization signal configuration information. In this way, the other nodes may detect the synchronization signals of the second node at the M first SS/PBCH block time-frequency positions, and the second node may detect the synchronization signals of the other nodes at the N second SS/PBCH block time-frequency positions, thereby implementing the mutual discovery between the relay nodes and preventing the relay node from detecting each SS/PBCH block in the candidate SS/PBCH block set. This reduces resource and time overheads for the mutual discovery between the relay nodes.

Further, the synchronization signal configuration information may further be used to indicate a beam at a synchronization signal time-frequency position. In the following Embodiment 1, the synchronization signal configuration information may be used to indicate transmit beam information of a first synchronization signal. In the following Embodiment 2, the synchronization signal configuration information may be used to indicate receive beam information of a second synchronization signal. The following describes details.

Embodiment 1

The synchronization signal configuration information is further used to indicate beam information of H of M first SS/PBCH blocks, where M≥H (that is, the synchronization signal configuration information is further used to indicate beam information of H of M first synchronization signals).

Optionally, a first node may alternatively indicate the beam information of the H first SS/PBCH blocks to a second node by using another message. For example, the first node may send beam indication information to the second node, where the beam indication information is used to indicate the beam information of the H of the M first SS/PBCH blocks. A quantity of messages used by the first node to indicate the beam information of the H first SS/PBCH blocks is not specifically limited in this embodiment of this application.

When M=H, beam information of all the M first SS/PBCH blocks is configured. Correspondingly, when the second node sends synchronization signals at M first SS/PBCH block time-frequency positions, the second node may send the synchronization signals at the M first SS/PBCH block time-frequency positions by using the configured beam information.

When M>H, the beam information of the H first SS/PBCH blocks is configured, and beam information of (M-H) first SS/PBCH blocks is not configured. Optionally, the beam information of the (M-H) first SS/PBCH blocks may be customized by the second node, that is, the second node may select the beam information of the (M-H) first SS/PBCH blocks, to serve child UE and a child relay node. Alternatively, the second node reserves the (M-H) first SS/PBCH blocks, and does not send synchronization signals on the (M-H) first SS/PBCH blocks. For example, positions of the (M-H) first SS/PBCH blocks are set to zero, or data scheduling is performed at positions of the (M-H) first SS/PBCH blocks. Alternatively, beam information of some of the (M-H) first SS/PBCH blocks may be customized by the second node, and some other first SS/PBCH blocks may be reserved. Correspondingly, when the beam information of the (M-H) first SS/PBCH blocks includes the beam information of some first SS/PBCH blocks that is customized by the second node, the second node may select the customized beam information of some first SS/PBCH blocks, send, by using the selected beam information, the synchronization signals at time-frequency resources of some first SS/PBCH blocks of which the beam information is customized, and send the synchronization signals at H first SS/PBCH block time-frequency positions by using the configured beam information. Optionally, the second node may report a required quantity (M-H) to the first node, that is, the second node reports a quantity of synchronization signals required by the second node to serve the child UE and the child relay node.

It should be noted that W SS/PBCH blocks may be classified into three types: a first SS/PBCH block, a second SS/PBCH block, and a reserved SS/PBCH block. The reserved SS/PBCH block may include an SS/PBCH block of which beam information is not configured in the first SS/PBCH blocks, and may also include a blank SS/PBCH block. Optionally, the first SS/PBCH block may alternatively be classified into two types: customized beam information and configured beam information. During actual application, the W SS/PBCH blocks may alternatively be classified into another combination form. This is not specifically limited in this embodiment of this application.

In a possible implementation, transmit beam information of at least one of the H first SS/PBCH blocks is associated with a piece of specified transmit beam information of the second node. Optionally, the transmit beam information of the at least one first SS/PBCH block is the same as or similar to the specified transmit beam information, or the transmit beam information of the at least one first SS/PBCH block has a quasi-co-location (QCL) relationship with the specified transmit beam information. For example, a beam transmit direction of the at least one first SS/PBCH block is the same as a specified transmit beam direction, or is near a specified transmit beam direction.

Optionally, the specified transmit beam information may be beam information of a specified synchronization signal of the second node. The beam information of the at least one first SS/PBCH block may be the same as the beam information of the specified synchronization signal. For example, the transmit beam information of the at least one first SS/PBCH block is the same as beam information of a particular first SS/PBCH block previously sent by the second node, that is, an SS/PBCH block at a particular position is replicated to a position of the at least one first SS/PBCH block. Alternatively, a beam of the at least one first SS/PBCH block may have a QCL relationship related to spatial information with the specified synchronization signal.

In a possible implementation, at least one of the H first SS/PBCH blocks is associated with a specified transmit signal of the second node. The specified transmit signal may be a synchronization signal or a reference signal, and the reference signal may be a CSI-RS, an SRS, a DMRS, or the like.

In a possible implementation, a relay network further includes a third node, and transmit beam information of at least one of the H first SS/PBCH blocks is associated with specified transmit beam information of the third node.

In a possible implementation, a relay network further includes a third node, and transmission of at least one of the H first SS/PBCH blocks is associated with the third node.

The third node is a relay node or a base station, and the second node may receive a particular signal of the third node. For example, the second node may obtain a synchronization signal of the third node through cell search, or the second node is configured to receive a CSI-RS of the third node.

In a possible implementation, the second node reports a cell search result of the second node to the first node, and the search result includes a list of nodes discovered by the second node, and the list includes a third node. Reporting information may include a number of a synchronization signal or a reference signal (signal A for short) of the third node detected by the second node.

When configuring that transmission of the first synchronization signal performed by the second node is associated with the third node, the first node may configure that the first synchronization signal is associated with the signal A, for example, indicate that the first synchronization signal has a QCL relationship with the signal A.

In addition, when configuring that transmission performed by the second node at the first synchronization signal time-frequency position is associated with the third node, the first node may only indicate that the synchronization signal sent by the second node at the first synchronization signal time-frequency position is associated with the third node (or notify the second node of a position at which the synchronization signal of the third node is received), and does not indicate specific beam information. The specific beam information is determined by the second node.

The at least one first SS/PBCH block may include one or more first SS/PBCH blocks. When the at least one first SS/PBCH block includes a plurality of first SS/PBCH blocks, the plurality of first SS/PBCH blocks may correspond to one beam, or may correspond to a plurality of beams. In other words, the transmit beam information of the at least one first SS/PBCH block may include one or more beams.

For example, when the second node detects a particular synchronization signal (denoted as an SSB #X) of the third node in a scanning process, the synchronization signal of the second node may be configured, so that the third node discovers the second node. A specific procedure may be as follows: The second node discovers the third node during scanning, or the first node configures the second node to scan the third node, and the second node discovers the third node during scanning. The second node then reports a scanning result to the first node. The first node configures the second node to send an SS/PBCH block associated with the SSB #X of the third node at a particular first SS/PBCH block position (or a plurality of first SS/PBCH block positions), so that the third node discovers the first node. The SSB herein may be short for the SS/PBCH block.

Figure 7:
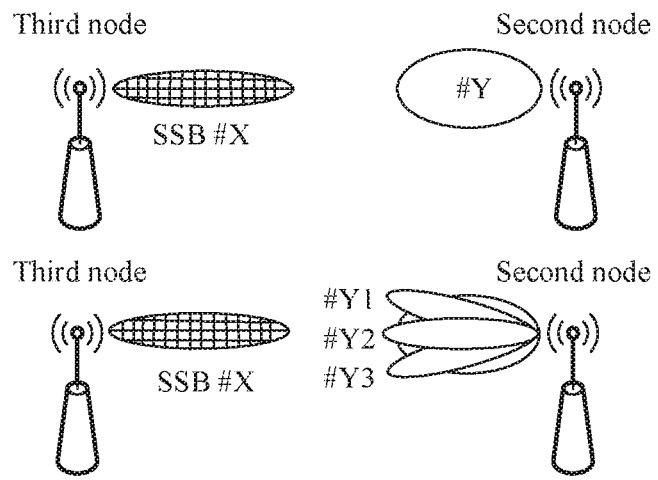
FIG. 7 is a schematic diagram of scanning a beam according to an embodiment of this application.

For example, as shown in FIG. 7, a receive beam direction of the second node is #Y. It is assumed that the beam #Y is a wide beam, and the beam #Y may include three narrow beams: #Y1, #Y2, and #Y3. Based on this, that the second node sends the SS/PBCH block associated with the SSB #X may include the following three cases:

(1) Directly send the beam #Y, that is, directly send the first SS/PBCH block in the receive beam direction. In other words, it indicates that transmission of one synchronization signal has a QCL relationship with the signal A.

(2) Scan and send the beams #Y1, #Y2, and #Y3, that is, the second node may send different first SS/PBCH blocks by using the beams #Y1, #Y2, and #Y3. For example, there are three first SS/PBCH blocks used to send synchronization signals. A first SS/PBCH block is sent by using #Y1, a second SS/PBCH block is sent by using #Y2, and a third SS/PBCH block is sent by using #Y3. In other words, it indicates that transmission of N synchronization signals has a QCL relationship with the signal A, and N may be reported by the second node.

(3) Send an optimal beam in the beams #Y1, #Y2, #Y3, that is, send the first SS/PBCH block by using the optimal beam in the three beams. In this case, the first node needs to reserve a scanning time for the second node after transmission is configured, so that the second node determines the optimal beam in the beams #Y, #Y2, and #Y3. In other words, it indicates that transmission of one synchronization signal has a QCL relationship with the signal A. In addition, the second node needs a specific time to perform optimal beam search. The time may be specified in a protocol, configured by the first node, or determined and then reported by the second node. For example, the second node may report information about success configuration of SSB transmission to the first node, and the first node may configure, after receiving acknowledgment information, remaining nodes to receive the synchronization signal.

In a possible implementation, transmit beam information of at least one of the H first SS/PBCH blocks is associated with a piece of specified transmit beam information of the first node.

In a possible implementation, at least one of the H first SS/PBCH blocks is associated with a specified transmit signal of the first node.

Embodiment 2

The synchronization signal configuration information is further used to indicate receive beam information of K of N second SS/PBCH blocks (that is, the synchronization signal configuration information is further used to indicate beam information of K of N second synchronization signals). The receive beam information of the second SS/PBCH blocks is indicated, so that resource and time overheads for performing beam scanning by a relay node can be further reduced.

In a possible implementation, receive beam information of at least one of the K second SS/PBCH blocks is associated with a piece of specified transmit beam information of the second node. For example, the specified transmit beam information may be transmit beam information of another synchronization signal or another reference signal that is configured by the second node.

In a possible implementation, at least one of the K second SS/PBCH blocks is associated with a specified transmit signal of the second node. The specified transmit signal may be a synchronization signal or a reference signal that is configured by the second node. In other words, the second node receives another reference signal in a transmit beam direction of an existing reference signal.

In a possible implementation, a relay network further includes a third node, and receive beam information of at least one of the K second SS/PBCH blocks is associated with receive beam information of a specified transmit signal of the third node received by the second node. The first node may instruct the second node to detect a synchronization signal or a reference signal of the third node on the at least one second SS/PBCH block, and the used receive beam information may be configured receive beam information that is used when the second node communicates with the third node. In addition, the at least one second SS/PBCH block may include one or more second SS/PBCH blocks. When the at least one second SS/PBCH block includes a plurality of second SS/PBCH blocks, the plurality of second SS/PBCH blocks may correspond to one beam, or may correspond to a plurality of beams. In other words, the receive beam information may include one or more beams.

Specifically, the first node may further configure the second node to perform signal detection at one or more corresponding SS/PBCH block positions, that is, detect the synchronization signal of the third node, so that the second node discovers the third node.

Optionally, there may be two signal detection modes.

Mode 1: The second node searches for the synchronization signal of the third node at a specified position. In this case, the first node may configure, for the second node, a time-frequency position for searching and a sequence ID that is sent by a searched node (for example, the third node).

Mode 2: The second node searches for the synchronization signal of the third node at a specified position by using a specified beam. In this case, the first node may configure, for the second node, a time-frequency position for searching, beam information, and a sequence ID (the sequence ID may alternatively be replaced with an ID of a searched node or an ID of a searched reference signal) that is sent by the searched node (for example, the third node).

It should be noted that the sequence ID may be a cell physical ID, a UE ID, or an ID obtained through calculation by using another parameter, or the like. This is not specifically limited in this embodiment of this application.

In the second signal detection mode, the first node indicates beam information of the SS/PBCH block detected by the second node, so that when using the plurality of beams, the second node can be prevented from switching different beams to perform signal detection, thereby further reducing resource and time overheads for mutual discovery between the relay nodes.

In a possible implementation, receive beam information of at least one of the K second SS/PBCH blocks is associated with a piece of specified transmit beam information of the first node.

In a possible implementation, at least one of the K second SS/PBCH blocks is associated with a specified transmit signal of the first node.

In a possible implementation, the relay network further includes a fourth node. The first node may instruct the second node to detect a synchronization signal of a fourth signal on the at least one second SS/PBCH block, and the first node may not indicate the receive beam information of the at least one second SS/PBCH block.

Further, when a particular relay node is in a mobile state (for example, the second node is in a mobile state), the mobile relay node needs to continuously perform scanning for radio resource management (RRM) and switching. A network may configure that a beam scanned by the mobile relay node does not conflict with a beam sent by the mobile relay node. For example, scanning performed by the mobile relay node on an SS/PBCH block position set is restricted, that is, the mobile relay node is configured not to scan a position at which the mobile relay node sends an SS/PBCH block, so that synchronization signal configuration of the mobile relay node is implemented, and transmission of the synchronization signal of the mobile relay node is not affected during mobility measurement.

For example, for ease of understanding, 10 SS/PBCH blocks are used as an example herein to describe in detail configuration related to the SS/PBCH block in synchronization configuration information. It is assumed that the first node is a configuration node, the second node is a configured node, and the third node and the fourth node are other relay nodes in the relay network, a configuration status of the second node may be shown in the following Table 1. In Table 1, an SSB represents an SS/PBCH block, a transmit SSB represents a first SS/PBCH block, and a receive SSB represents a second SS/PBCH block.

TABLE 1

| SSB number | Transmit/ Receive | Specified beam | Associated node | Associated SSB/RS | Remark |
|---|---|---|---|---|---|
| 1 | Transmit | No | — | — | Customized beam |
| 2 | Transmit | No | — | — | Customized beam |
| 3 | Transmit | Yes | First node | First node SSB ID | Having a QCL relationship with a transmit SSB beam of the first node |
| 4 | Transmit | Yes | Second node | Second node SSB ID | Having a QCL relationship with a transmit SSB beam of the second node |
| 5 | Transmit | Yes | Third node | Third node SSB ID | Having a QCL relationship with a transmit SSB beam of the third node |
| 6 | Transmit | No | Fourth node | — | Associated with the fourth node, and a beam is not specifically specified |
| 7 | Receive | Yes | First node | First node SSB ID | 1. Receiving an SSB of the first node 2. A beam has a QCL relationship with a beam of the first node |
| 8 | Receive | Yes | Third node | Second node SSB ID | 1. Receiving an SSB of the third node 2. A beam has a QCL relationship with a beam of the second node |
| 9 | Receive | Yes | Third node | Third node SSB ID | 1. Receiving an SSB of the third node 2. A beam has a QCL relationship with a beam of the third node |
| 10 | Receive | No | Fourth node | — | 1. Receiving an SSB of the fourth node 2. A beam is not specified |

It should be noted that, in the foregoing Table 1, an SSB 1 to an SSB 6 may represent first SS/PBCH blocks that are configured in the synchronization signal configuration information and that are used to send the synchronization signals. The SSB 1 and an SSB 2 represent first SS/PBCH blocks of which beams are customized by the second node. An SSB 3 to the SSB 6 represent first SS/PBCH blocks of which transmit beam information or an associated node is specified by the first node. An SSB 7 to an SSB 10 may represent second SS/PBCH blocks that are configured in the synchronization signal configuration information and that are used to detect the synchronization signals. The associated node is a receive node or a transmit node of the SSB. In a possible implementation, the associated node and the associated SSB/RS may not be indicated at the same time.

In addition, in the embodiments of this application, that two pieces of beam information are associated may include: The two pieces of beam information are the same, or there is a quasi-co-location (QCL) relationship between the two pieces of beam information. That two signals are associated may mean that there is a quasi-co-location (QCL) relationship related to spatial receive information between the two signals.

In another embodiment of this application, the mutual discovery between the relay nodes may alternatively be implemented by configuring a reference signal of the relay node included in the relay network. For example, the first node may configure a position at which the second node sends the reference signal and a position at which the second node detects a reference signal of another relay node, so that the second node can send the reference signal at the corresponding position and detect the reference signal of the another relay node at the corresponding position, to implement the mutual discovery between the relay nodes. Specifically, a process in which the mutual discovery between the relay nodes is implemented by configuring the reference signal of the relay node included in the relay network is similar to the foregoing process of configuring the synchronization signal of the relay node. For details, refer to the foregoing descriptions. Details are not described again in this embodiment of this application.

The solutions provided in the embodiments of this application are described above mainly from a perspective of interaction between network elements. It may be understood that to implement the foregoing functions, each network element, for example, the first node, the second node, and the third node, includes a corresponding hardware structure and/or software module for performing each function. A person skilled in the art should easily be aware that, in combination with the examples described in the embodiments disclosed in this specification, network elements and algorithms steps in this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the first node and the second node may be obtained through division based on the foregoing method examples. For example, the function modules may be obtained through division corresponding to functions, or two or more functions may be integrated into one processing module. The foregoing integrated module may be implemented in a form of hardware, or may be implemented in a form of a software function module. It should be noted that, in the embodiments of this application, module division is an example, and is merely logical function division. During actual implementation, another division manner may be used.

Figure 8:
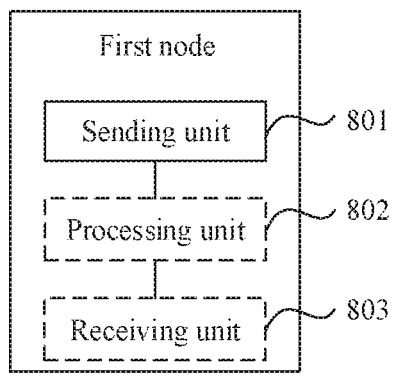
FIG. 8 is a schematic structural diagram of a first node according to an embodiment of this application.

When the function modules are obtained through division corresponding to the functions. FIG. 8 is a possible schematic structural diagram of a first node provided in the foregoing embodiments. The first node includes a sending unit 801. The sending unit 801 is configured to support the first node in performing S501 in FIG. 5, a step of sending detection indication information to a third node, and the like. Optionally, the first node may further include a processing unit 802 and a receiving unit 803. The processing unit 802 is configured to support the first node in performing a step of generating synchronization signal configuration information, and/or another technical process described in this specification. The receiving unit 803 is configured to support the first node in performing a step of receiving information from another node.

In a hardware implementation, the processing unit 802 may be a processor. The sending unit 801 may be a transmitter, the receiving unit 803 may be a receiver, and the receiver and the transmitter may form a communications interface.

Figure 9:
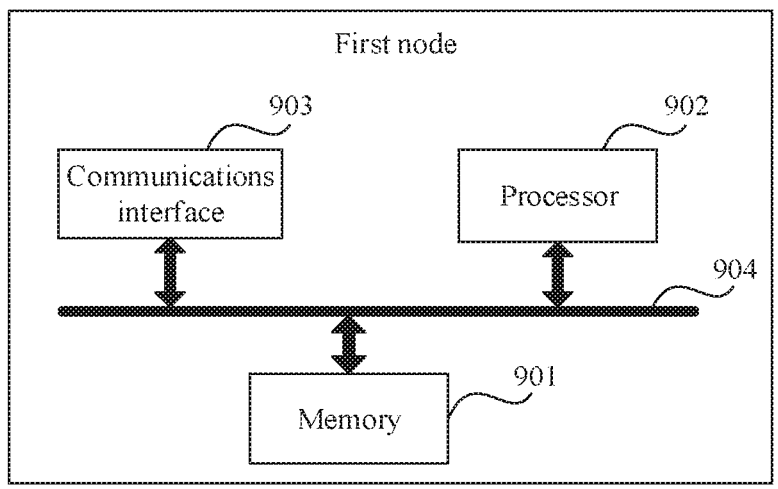
FIG. 9 is a schematic structural diagram of another first node according to an embodiment of this application.

FIG. 9 is a schematic diagram of a possible logical structure of a first node provided in the foregoing embodiments according to an embodiment of this application. The first node includes a memory 901 and a processor 902. The memory 901 is configured to store code and data of the first node. In this embodiment of this application, the processor 902 is configured to control and manage an action of the first node. For example, the processor 902 is configured to support the first node in performing a step of generating synchronization signal configuration information, and/or another process of the technology described in this specification. Optionally, the first node may further include a communications interface 903 and a bus 904. The processor 902, the communications interface 903, and the memory 901 are mutually connected by using the bus 904. The communications interface 903 is configured to support the first node in performing communication.

The processor 902 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 904 may be a peripheral component interconnect (PCI) standard bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
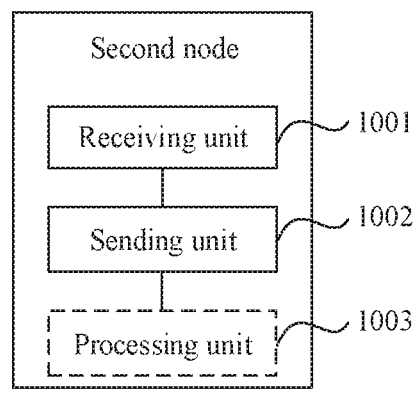
FIG. 10 is a schematic structural diagram of a second node according to an embodiment of this application.

When the function modules are obtained through division corresponding to the functions, FIG. 10 is a possible schematic structural diagram of a second node provided in the foregoing embodiments. The second node includes a receiving unit 1001 and a sending unit 1002. The receiving unit 1001 is configured to support the second node in performing S502 in FIG. 5, a step of detecting synchronization signals at N second SS/PBCH block time-frequency positions in S503, and the like. The sending unit 1002 is configured to support the second node in performing a step of sending synchronization signals at M first SS/PBCH block time-frequency positions in S503 in FIG. 5. Optionally, the second node may further include a processing unit 1003. The processing unit 1003 is configured to support the second node in performing a step of parsing synchronization signal configuration information, and/or another technical process described in this specification.

In a hardware implementation, the processing unit 1003 may be a processor. The receiving unit 1001 may be a receiver, the sending unit 1002 may be a transmitter, and the receiver and the transmitter may form a communications interface.

Figure 11:
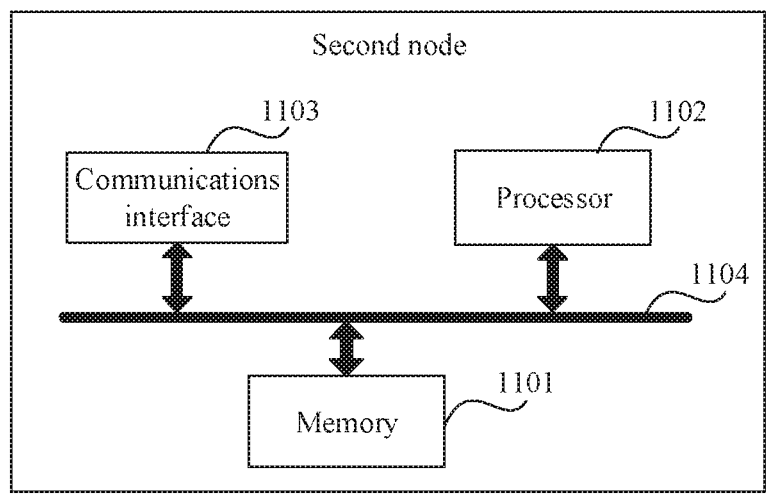
FIG. 11 is a schematic structural diagram of another second node according to an embodiment of this application.

FIG. 11 is a schematic diagram of a possible logical structure of a second node provided in the foregoing embodiments according to an embodiment of this application. The second node includes a memory 1101 and a processor 1102. The memory 1101 is configured to store code and data of the second node. In this embodiment of this application, the processor 1102 is configured to control and manage an action of the second node. For example, the processor 1102 is configured to support the second node in performing a step of parsing synchronization signal configuration information, and/or another process of the technology described in this specification. Optionally, the second node may further include a communications interface 1103 and a bus 1104. The processor 1102, the communications interface 1103, and the memory 1101 are mutually connected by using the bus 1104. The communications interface 1103 is configured to support the second node in performing communication.

The processor 1102 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 1104 may be a peripheral component interconnect (PCI) standard bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

A readable storage medium is further provided in another embodiment of this application. The readable storage medium stores a computer-executable instruction. When a device (which may be a single-chip microcomputer, a chip, or the like) or a processor performs some or all steps of the first node in the synchronization signal configuration method provided in FIG. 5, the readable storage medium may include: any medium that can store program code, such as a USB flash drive, a removable hard disk, a read-only memory, a random access memory, a magnetic disk, or an optical disc.

A readable storage medium is further provided in another embodiment of this application. The readable storage medium stores a computer-executable instruction. When a device (which may be a single-chip microcomputer, a chip, or the like) or a processor performs some or all steps of the second node in the synchronization signal configuration method provided in FIG. 5, the readable storage medium may include: any medium that can store program code, such as a USB flash drive, a removable hard disk, a read-only memory, a random access memory, a magnetic disk, or an optical disc.

A computer program product is further provided in another embodiment of this application. The computer program product includes a computer-executable instruction, and the computer-executable instruction is stored in a computer-readable storage medium. At least one processor of a device may read the computer-executable instruction from the computer-readable storage medium, and the at least one processor executes the computer-executable instruction, so that the device performs some or all steps of the first node in the synchronization signal configuration method provided in FIG. 5.

A computer program product is further provided in another embodiment of this application. The computer program product includes a computer-executable instruction, and the computer-executable instruction is stored in a computer-readable storage medium. At least one processor of a device may read the computer-executable instruction from the computer-readable storage medium, and the at least one processor executes the computer-executable instruction, so that the device performs some or all steps of the second node in the synchronization signal configuration method provided in FIG. 5.

A communications system is further provided in another embodiment of this application. The communications system includes a plurality of nodes. The plurality of devices include a first node and a second node. The first node is a parent node of the second node. The first node may be the first node provided in FIG. 8 or FIG. 9, and is configured to perform the steps of the first node in the synchronization signal configuration method provided in FIG. 5; and/or the second node may be the second node provided in FIG. 10 or FIG. 11, and is configured to perform the steps of the second node in the synchronization signal configuration method provided in FIG. 5.

In the embodiments of this application, the first node is the parent node of the second node, and the first node sends the synchronization signal configuration information to the second node, where the synchronization signal configuration information is used to indicate the M first synchronization signal time-frequency positions and the N second synchronization signal time-frequency positions, so that when receiving the synchronization signal configuration information, the second node can send the synchronization signals based on the synchronization signal configuration information and detect the synchronization signals of the other nodes based on the synchronization signal configuration information. In this way, the other nodes may detect the synchronization signals of the second node at the M first synchronization signal time-frequency positions, and the second node may detect the synchronization signals of the other nodes at the N second synchronization signal time-frequency positions, thereby implementing the mutual discovery between the relay nodes and preventing the relay node from detecting each synchronization signal time-frequency position in the candidate synchronization signal time-frequency position set. This reduces the resource and time overheads for the mutual discovery between the relay nodes.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A synchronization signal configuration method applied to a relay network comprising a first node and a second node, wherein the first node is a parent node of the second node, and wherein the method comprises:
sending, by the first node, synchronization signal configuration information to the second node, wherein the synchronization signal configuration information is used to indicate M first synchronization signal time-frequency positions and N second synchronization signal time-frequency positions in a candidate synchronization signal time-frequency position set, the synchronization signal configuration information instructing the second node to:
send a first synchronization signal using the M first synchronization signal time-frequency positions; and
receive or detect a second synchronization signal using the N second synchronization signal time-frequency positions;
wherein the candidate synchronization signal time-frequency position set comprises W synchronization signal time-frequency positions, and wherein $W \geq (M+N)$.

2. The method according to claim 1, wherein the synchronization signal configuration information is further used to indicate transmit beam information of H first synchronization signals of M first synchronization signals, and wherein $M \geq H$.

3. The method according to claim 2, wherein transmit beam information of at least one of the H first synchronization signals is associated with a piece of specified transmit beam information of the second node.

4. The method according to claim 2, wherein at least one of the H first synchronization signals is associated with a specified transmit signal of the second node.

5. The method according to claim 2, wherein the relay network further comprises a third node, and wherein transmit beam information of at least one of the H first synchronization signals is associated with specified transmit beam information of the third node.

6. The method according to claim 5, wherein the transmit beam information of the at least one first synchronization signal is associated with receive beam information of a specified transmit signal of the third node received by the second node.

7. The method according to claim 2, wherein the relay network further comprises a third node, and wherein at least one of the H first synchronization signals is associated with a specified transmit signal of the third node.

8. The method according to claim 1, wherein the synchronization signal configuration information is further used to indicate receive beam information of K second synchronization signals of N second synchronization signals received by the second node.

9. The method according to claim 8, wherein receive beam information of at least one of the K second synchronization signals is associated with a piece of specified transmit beam information of the second node.

10. The method according to claim 8, wherein at least one of the K second synchronization signals is associated with a specified transmit signal of the second node.

11. The method according to claim 8, wherein the relay network further comprises a third node, and wherein receive beam information of at least one of the K second synchronization signals is associated with receive beam information of a specified transmit signal of the third node received by the second node.

12. The method according to claim 3, wherein an association between the transmit beam information of the at least one of the H first synchronization signals and the piece of specified transmit beam information of the second node is a quasi-co-location relationship related to spatial receive information.

13. A node, wherein the node is a first node in a relay network, wherein the relay network further comprises a second node, wherein the first node is a parent node of the second node, and wherein the node comprises:
one or more memories configured to store instructions; and
one or more processors coupled to the one or more memories, wherein the instructions, when executed by the one or more processors, cause the node to:
send synchronization signal configuration information to the second node, wherein the synchronization signal configuration information is used to indicate M first synchronization signal time-frequency positions and N second synchronization signal time-frequency positions in a candidate synchronization signal time-frequency position set, the synchronization signal configuration information instructing the second node to:
send a first synchronization signal using the M first synchronization signal time-frequency positions; and
receive or detect a second synchronization signal using the N second synchronization signal time-frequency positions;
wherein the candidate synchronization signal time-frequency position set comprises W synchronization signal time-frequency positions, and wherein $W \geq (M+N)$.

14. The node according to claim 13, wherein the synchronization signal configuration information is further used to indicate transmit beam information of H first synchronization signals of M first synchronization signals, and wherein $M \geq H$.

15. The node according to claim 14, wherein transmit beam information of at least one of the H first synchronization signals is associated with a piece of specified transmit beam information of the second node.

16. The node according to claim 14, wherein at least one of the H first synchronization signals is associated with a specified transmit signal of the second node.

17. The node according to claim 14, wherein the relay network further comprises a third node, and wherein transmit beam information of at least one of the H first synchronization signals is associated with specified transmit beam information of the third node.

18. The node according to claim 17, wherein the transmit beam information of the at least one first synchronization signal is associated with receive beam information of a specified transmit signal of the third node received by the second node.

19. The node according to claim 14, wherein the relay network further comprises a third node, and wherein at least one of the H first synchronization signals is associated with a specified transmit signal of the third node.

20. The node according to claim 15, wherein an association between the transmit beam information of the at least one of the H first synchronization signals and the piece of specified transmit beam information of the second node is a quasi-co-location relationship related to spatial receive information.

* * * * *